United States Patent [19]

Foster

[11] 3,996,671

[45] Dec. 14, 1976

[54] INSTRUCTION MACHINE

[76] Inventor: Richard W. Foster, 7600 Saxon Drive, Huntsville, Ala. 35802

[22] Filed: Mar. 19, 1974

[21] Appl. No.: 452,524

[52] U.S. Cl. ............................. 35/8 A; 35/9 A; 35/35 C; 360/72
[51] Int. Cl.² ....................................... G09B 7/08
[58] Field of Search ............... 35/6, 8 R, 8 A, 9 R, 35/9 A, 35 C, 48 R; 360/61, 55, 106, 72; 179/100.1 PS; 340/172.5

[56] References Cited

UNITED STATES PATENTS

| | | | |
|---|---|---|---|
| 3,141,243 | 7/1964 | Chapman et al. | 35/9 A |
| 3,460,270 | 8/1969 | Blitz et al. | 35/6 |
| 3,488,867 | 1/1970 | Lyon et al. | 35/35 C |
| 3,537,190 | 11/1970 | Serrell et al. | 35/9 A |
| 3,609,880 | 10/1971 | Arbon | 35/9 A |
| 3,623,157 | 11/1971 | Stapleford | 340/172.5 |
| 3,623,238 | 11/1971 | Laplume et al. | 35/9 A |
| 3,665,163 | 5/1972 | Mast et al. | 35/35 C X |
| 3,703,602 | 11/1972 | Shenshev | 35/35 C |
| 3,718,984 | 3/1973 | Hewitt | 35/9 A |
| 3,727,203 | 4/1973 | Crossman | 360/72 |
| 3,731,006 | 5/1973 | Streiffert et al. | 360/106 X |
| 3,812,533 | 5/1974 | Kimura et al. | 360/72 X |

Primary Examiner—Richard C. Pinkham
Assistant Examiner—Vance Y. Hum
Attorney, Agent, or Firm—C. A. Phillips

[57] ABSTRACT

An instruction machine employing a multi-track (two channels on each track) tape recorder wherein analog instructions are recorded on one channel of a tape and control signals are recorded on the other channel. Control signals perform a number of functions and are recorded on a tape responsive to operation of a digital keyboard. Typically, an instructor would record a lecture on one channel and control signals (e.g. for reproduction of material recorded elsewhere) on the other channel, the control signals being positioned opposite points in a recorded lecture where some equipment control is desired, e.g. for providing supplemental displays or continuation of the lecture on another track. For example, a student might be questioned and the student required to indicate his answer by operation of the keyboard. If the student's answer did not display certain knowledge, represented by the selection of a correct answer coded on the control signal channel, the tape transport would be caused to move to a different track and field position on the tape to reproduce certain other lecture material in order that the student be given particular additional instruction.

12 Claims, 5 Drawing Figures

INSTRUCTION MACHINE

FIELD OF THE INVENTION

This invention relates to devices which are commonly referred to as teaching or instruction machines and particularly to a machine of this category which is simpler and less costly than previous types.

BACKGROUND OF THE INVENTION

Teaching machines, that is, devices, machines and systems which enable one to learn by listening to and interacting with mechanical or electronic means, take many forms and vary greatly in their degree of sophistication. The problem which exists with known teaching machines is that in order for the educational experience to provide sufficiently broad and extensive teaching, existing machines are too expensive for purchase by an overwhelming number of institutions desiring them. The reason for the high cost is simply that in order to provide adequate selective recall of material, full blown computers with vast electronic memories are required; and these are very expensive. A further difficulty is that computer specialists are required to program such current systems.

It is, accordingly, the object of this invention to provide a teaching machine which will perform the same function as a digital computer operating as a teaching machine at a small fraction of the cost.

BRIEF DESCRIPTION OF THE DRAWINGS

FIG. 1a is an electrical block diagram summarizing the system of the present invention.

SUMMARY OF THE INVENTION

Figure 1:
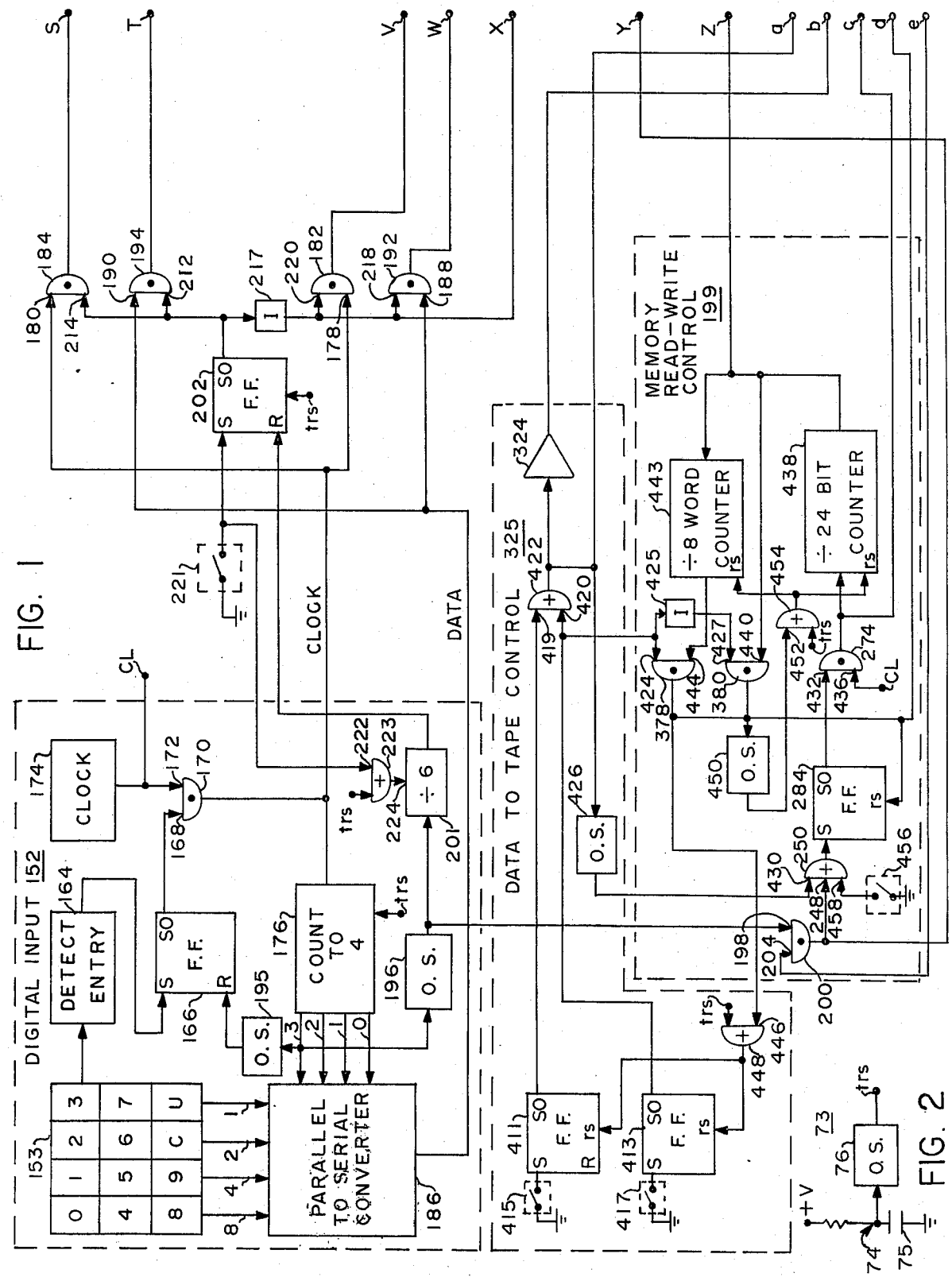
FIGS. 1–4 together comprise an electrical block diagram of an embodiment of the invention.

In accordance with the invention, a dual channel recorder is employed wherein verbal information, e.g. a lecture, is recorded on one of the channels and coordinate control signals are recorded on the other channel. Means are provided for coding field positions and for positioning a recording playback transducer at any selected position for reproduction of material in any selected order on the recording medium. Means are further provided for the instructor to readily code control signals and for a student to be directed to a particular recorded information, depending upon answers given. Coding by the instructor and answers by the student are performed by means of an alphabetically coded keyboard. In accordance with one feature of the invention, a multi-track tape recorder is employed for recording and playing back any information. However, other dual track recording systems may be employed. Included would by systems of broad bandwidth capable of recording conventional television images read from tapes or discs by mechanical contact, reflected light, or transmitted light wherein such light is derived from a laser, electrical arc, or tungsten bulb, etc. Aside from this variation, the invention is generally summarized in terms of a machine employing a tape recording system as follows.

FIG. 1a is a simplified block diagram of the system illustrating its use as a teaching aid. The system uses an 82 track tape recorder 10 as a random access storage facility, and each track consists of two channels A and B. A pair of combination record-playback heads, one for each channel and movable to cover a selected track. A lecture to be presented, which may include speech, music or alphanumeric data, is first recorded in channel A of the required tracks.

Once the lecture is recorded, digital command words are then recorded at preselected locations within each adjacent channel B. These commands contain the necessary information to enable the system to automatically display photographic slides, select various output devices, and position the tape and record heads to any track and any location along the track, hereinafter referred to as a field position.

A lecture to be recorded is organized into the form of a manuscript. The appropriate slides, questions, and audio outputs to be presented during the lecture are indicated at the desired points to be presented. Typically, the tape will be programmed in two separate steps. First, the complete lecture portion is recorded in channel A of the required number of tracks. For this illustration it is assumed that the lecture required a recording time greater than the length of one track. Next, the necessary digital information which automatically controls the tape recorder is recorded at the designated locations in the associated channel B. Accordingly, the digital commands are then permanently associated with the audio portion of the program.

In order to record the lecture, channel A input select switch 47 is operated to the dotted line position. The output of audio amplifier 60, or alphanumeric device 61, then is selectively coupled as an input to channel "A" by selector switch 57. Assuming the lecture is to begin in track 1 and at the number 1 field location of that track, the following digital command is entered by keyboard 153 as follows: Keyboard output switch S1 is at the position shown in FIG. 1a. A 1-1-8 (representing track 1, field location 1 and a "go to" or "8" command) is entered into keyboard 153. The command word is loaded into buffer register 77 through OR gate 160. The two most significant digits 1—1 of the command are coupled from an output of buffer register 77 as a "tape address select" input of tape recorder 10. The least significant, or 8 digit, is coupled from an output of buffer register 77 as an input of command execute 146. Manual execute initiate switch 490 is operated, and a "go to" or "8" command is coupled as an input of recorder 10. Upon the receipt of the "go to" command, the record heads are positioned to track 1 and the tape is wound to field location 1, responsive to the 1-1 tape address command from buffer register 77, selected track and field locations being displayed by digital readouts 70 and 72, respectively.

Tape analog switch designated T.A. is then closed, applying power to the forward drive motor of tape recorder 10. The first portion of the lecture is recorded in track 1 in the form of speech or music via amplifier 60 or from alphanumeric device 61 as selected by switch 57. At each point in the lecture where a slide is to be shown or one of analog output devices, such as audio amplifier 54 printer 55 or C.R.T. 56 is to be selected, a notation is made of the exact track and field location as indicated by digital readouts 70 and 72, respectively. At a point near the end of track 1, wherein a suitable break point is reached in the lecture, tape analog switch T.A. is opened, and a notation is made of the field position of the tape, as indicated by readout 72. The tape is now repositioned to the next track 2 and field location 1 as follows: The appropriate address is track 2 field location 1 and 8 command which is loaded from keyboard 153 into buffer register 77 as described above. Manual execute switch 490 is momentarily operated gating a "go to" command into recorder 10, and whereby the tape is repositioned, in accordance with the digital output of buffer register 77, to track 2 field location 1. The lecture is now continued in track 2, and as before, a notation is made where any necessary commands are desired which are later to be recorded in track 2. In this manner, the lecture is recorded in the required number of tracks. Once the analog portion has been recorded, tape analog switch T.A. is opened, stopping the forward derive motor. Digital commands may now be recorded in channel B of each of the tracks wherein the lecture was previously recorded in channel A as follows: Channel B record select switch 46 is operated to the dotted line position as shown in FIG. 1a, and memory output switch S2 is positioned as shown. This connects the output of memory 154 to the input of channel B record head. Channel A output select switch 47 is preferably positioned to the monitor position as shown in FIG. a. Keyboard output switch S1 is also positioned as shown in FIG. 1a. Digital commands to be recorded are first entered into buffer register 77 from keyboard 153, and then loaded into memory 154, from which they are recorded on tape. To illustrate, it is assumed that a slide, for example slide 20, is to be shown at field position 55 during the first portion of the lecture in track 1, as has previously been noted in the manuscript. The appropriate command word would be recorded as follows: First, the selected location is entered into buffer register 77 from keyboard 153, as before, and consists of a 1-55 and an 8 command. Once the command is entered into buffer 77, a "go to" command causes the tape to be positioned to track 1 field position 55. A 2-0 followed by a U command digit is loaded into buffer register 77 which indicates slide 20 and a U command which when retrieved from the tape strobes the 2-0 into visual device control 138, an output of which is coupled to slide projector 139. Reset switch S3 of address counter 461 is operated to reset address counter 461 to zero and thus select memory location 1. Load memory switch 456 is operated, to serially transfer the word now in buffer register 77 into memory location 1. In order to record the command on tape, "tape data" switch T.D. is operated, applying a forward signal to the tape and enabling the transfer of the word now in memory location 1 through memory output switch S2 and channel B input switch 46 to the tape. Once information flow stops in channel B, the tape automatically stops. The next and each subsequent command is then recorded at a location as indicated in the manuscript in a manner as described above. Assuming the next command is to direct the output of channel A to printer 55 for example, appropriate device selection would be entered by keyboard 153 into register 77 along with a C command digit, which would then select printer 55 when played back.

At any point in the lecture, a question may be posed for the student which requires a multiple choice of true-false answer in order to test his comprehension of the subject. The answers are recorded on tape in the form of command words which contain appropriate track and field locations to which the student will be directed in accordance with an answer which he has selected. For instance, assuming the question requires one of four answers and occurs at field location 100 of track 1, the following command would be recorded on tape. A correct answer would be track 1, field location 100 to enable the lecture to continue, as it is indicated the student understands the subject matter thus far. The three incorrect answers would direct the student to other selected locations of the tape for further instruction, these locations being typically designated as branch locations. Assuming these locations to be in field position 1 of tracks 7, 8, and 9, then the command words in order of recording are track location 7, field position 1, and an 8 command, track location 8, field position 1, and an 8 command, track location 9, field position 1, and an 8 command. As was stated previously, the correct answer would simply be track 1, field location 100, and an 8 command. Before being recorded, each command is loaded into buffer register 77 and then loaded into the first four locations 1, 2, 3, and 4 of memory 154 by operating load memory switch 456. Once loaded into memory, the commands are recorded on tape as follows: Tape data switch T.D. is closed, energizing the forward drive motor and enabling a shift cycle from memory 154. The command words are serially recorded from memory locations 1, 2, 3, and 4 onto the tape. Each time a word is recorded, address counter 461 is stepped up by one count, thus selecting the next memory address. Once information flow stops in channel B, the forward drive motor is inhibited and the tape is halted. In order to enable the student to select an answer which is presented from the tape, a stop command is entered by keyboard 153 which contains no track and field locations, only a 9 command digit. This command is loaded into buffer 77, then memory 154 and from there is transcribed onto the tape, immediately following the four answers. Thus, when played back, the tape will halt when the four answers are stored in memory 154 as will be further described. Once the digital program has been completely recorded, channel B selector switch 46 is then operated to the position shown in FIG. 1a, wherein the output of channel B is directed as an input to one word delay 309 as one input to transfer complete 308, and through an input of OR gate 160 to buffer register 77. Keyboard output select switch S1 is then operated to the dotted line position, whereby any response from a student is gated into memory address buffer 236. The record-playback heads and magnetic tape are now repositioned to track 1, field location 0, respectively, by the appropriate "go to" command entered through keyboard 153. Tape analog switch T.A., when closed, serves as a forward drive signal to the tape, which is inhibited only by a stop command from command execute 146. As the lecture is monitored, the appropriate control commands are routed from channel B output signal lead into buffer register 77 where they are interpreted, as before described, to perform slide select, audio select, or automatically position the tape to any required position. At the termination of each command flowing from channel B into buffer register 77, a load complete signal automatically enables command execute 146 to output the desired function. When a question is posed by the instructor, as illustrated previously, all command words which represent answers are retrieved from the tape and transferred through buffer register 77 into the first four locatons of memory 154. A stop command, which was recorded following the eight possible answers, is thus located in buffer register 77. When the stop command is thus loaded into buffer 77, transfer complete 308 outputs a stop signal which inhibits the forward drive motor. This enables the student to select an answer by selecting one of keys 1, 2, 3, or 4 of keyboard 153. Once a selection is made, the selected word is brought from memory and stored in buffer register 77. When the selected command is completely transferred from memory into buffer 77 a load complete command causes the word in buffer register 77 to be interpreted, and a "go to" command is applied to tape recorder 10. If a student selects the correct answer, the command word directs the tape to its present location. In accordance with one of the three wrong answers, the tape is directed to one of field positions 0 of tracks 7, 8 or 9. Here the student will be given futher instructions and may be directed either back to the main body of the lecture at location 100 of track 1 or may be sent to even further branch locations for further instructions and more questions as predetermined by the instructor.

DETAILED DESCRIPTION OF THE DRAWINGS

Figure 4:
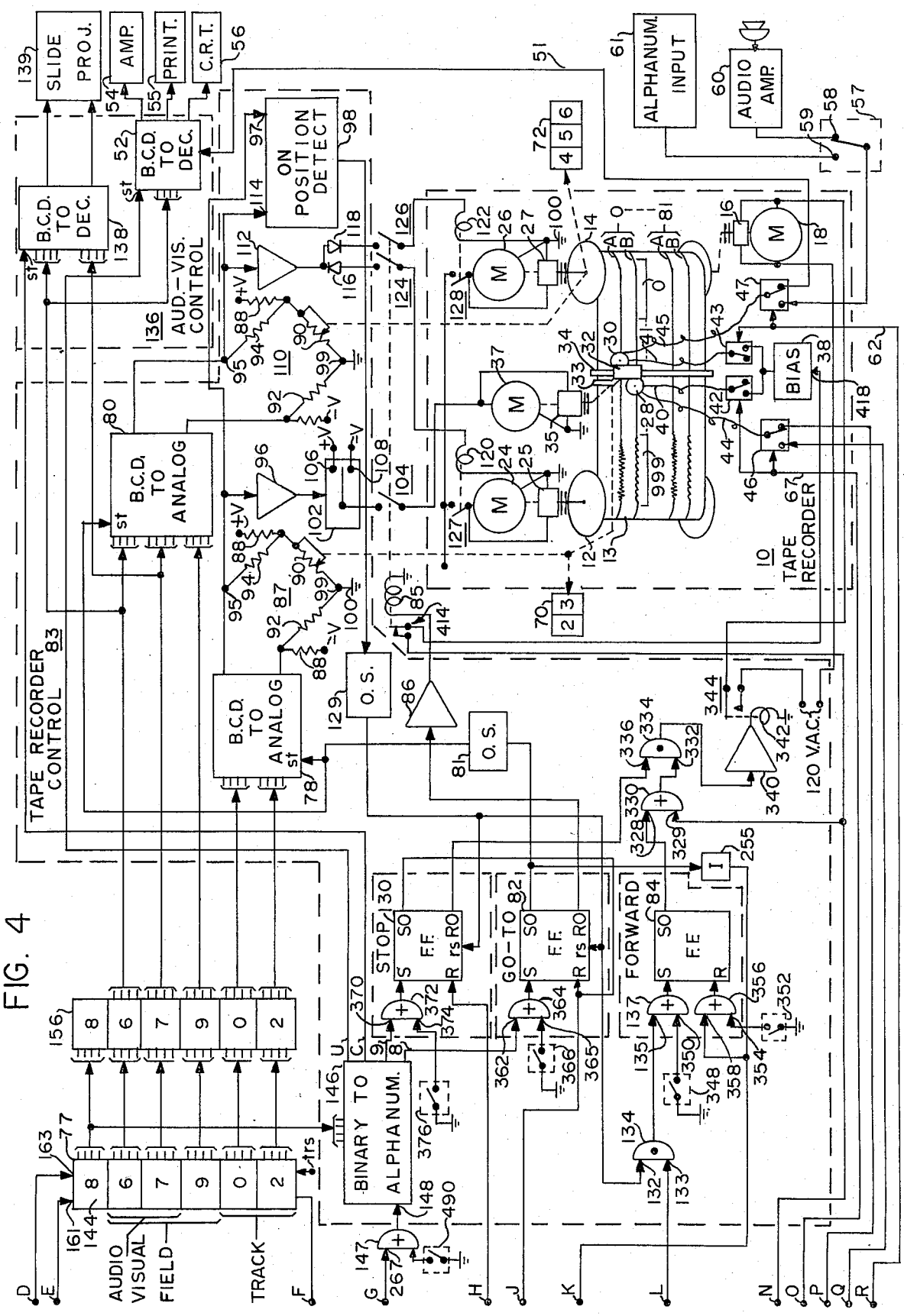

The basic storage device used in this system is a random access stereo tape recorder 10, shown at the lower right of FIG. 4. Recorder 10 has 82 tracks designated 0 through 81, each track consisting of two channela A and B. The 82 track tape is four inches in width and, when driven at a nominal speed of 3¾ inches per second, provides 22 minutes of recording for each track.

Recorder 10 includes a tape transport assembly which consists of supply reel or drum 12 onto which tape 13 is rewound or stored, and a take-up reel 14 onto which tape 13 is wound during the record and playback modes of operation. The take-up or forward drive reel 14 is selectively coupled through solenoid clutch 16 to a synchronous type motor 18.

In addition to the conventional forward drive motor 18 described above, the supply and take-up drums are also selectively driven through solenoid clutches 25 and 27 by motors 24 and 26, respectively, which serve to quickly position the tape to any one of a thousand different discrete locations, designated 0-999, hereinafter referred to as field positions, which are spaced along the length of the tape.

The dual purpose record-playback heads 28 and 30 are disposed so as to record in channels A and B, respectively, of a selected track and are mounted to head carrier 32, being slidably supported by transverse frame member 34. Head carrier 32 is coupled through driving member 33 and solenoid clutch 35 to reversible motor 37. Accordingly, record-playback heads 28 and 30 are positioned to any of selected tracks, 0 through 81 by motor 37, responsive to a B.C.D. command word indicative of a particular track, in a manner to be described. Each of the record-playback heads 28 and 30 includes a conventional 54 KHz bias and erase winding which is selectively excited by bias oscillator 38 only when in the "record" mode. This is done in order to prevent inadvertent destruction of useful information during playback and random select modes of operation, in a manner to be further described.

Each of record-playback heads 28 and 30 are identical, and the upper channel of each of tracks 0 through 81 is arbitrarily chosen as the analog channel, designated A. The lower adjacent channel B, is in turn typically designated as the digital channel of each track. Flexible bias input leads 40 and 41 of heads 28 and 30 are connected through the normally open contacts of switches 42 and 43, respectively, to the output of bias oscillator 38. Flexible record-playback signal leads 44 and 45 of heads 28 and 30, respectively, are connected to the movable arm of single pole-double throw switches 46 and 47, respectively, shown in the normal or unoperated position. The normally closed contact of switch 47 is selectively connected through lead 51 as an input to B.C.D. to decimal converter 52 and is thus selectively gated to amplifier 54, printer 55 or C.R.T. display 56. The normally open contact of switch 47 is connected to the movable arm of audio input device select switch 57. Stationary contacts 58 and 59 of switch 57 are in turn connected to the output of audio amplifier 60 or the output of alphanumeric device 61.

In order to make a recording in channel A, an enable signal is applied through line 62 to the control inputs of switches 43 and 47.

Digital information from channel B is routed through the normally closed contact of switch 46 which is connected through common terminal P to the input of frequency to voltage converter 65, which receives digital information from channel B. The normally open contact of switch 46 is connected through terminal Q to the output of voltage to frequency converter 66 from which digital information is recorded in channel B.

When a recording is to be made in channel B, an enable signal is applied through line 67 to the control inputs of switches 42 and 46. A two digit readout 70, which is mechanically coupled by a transducer, not shown, to driven member 33 of head carrier 32, displays a selected track position of record heads 28 and 30.

Three digit readout 72, being coupled in a similar manner to take-up drum 14, displays a selected field position of the tape.

Figure 2:
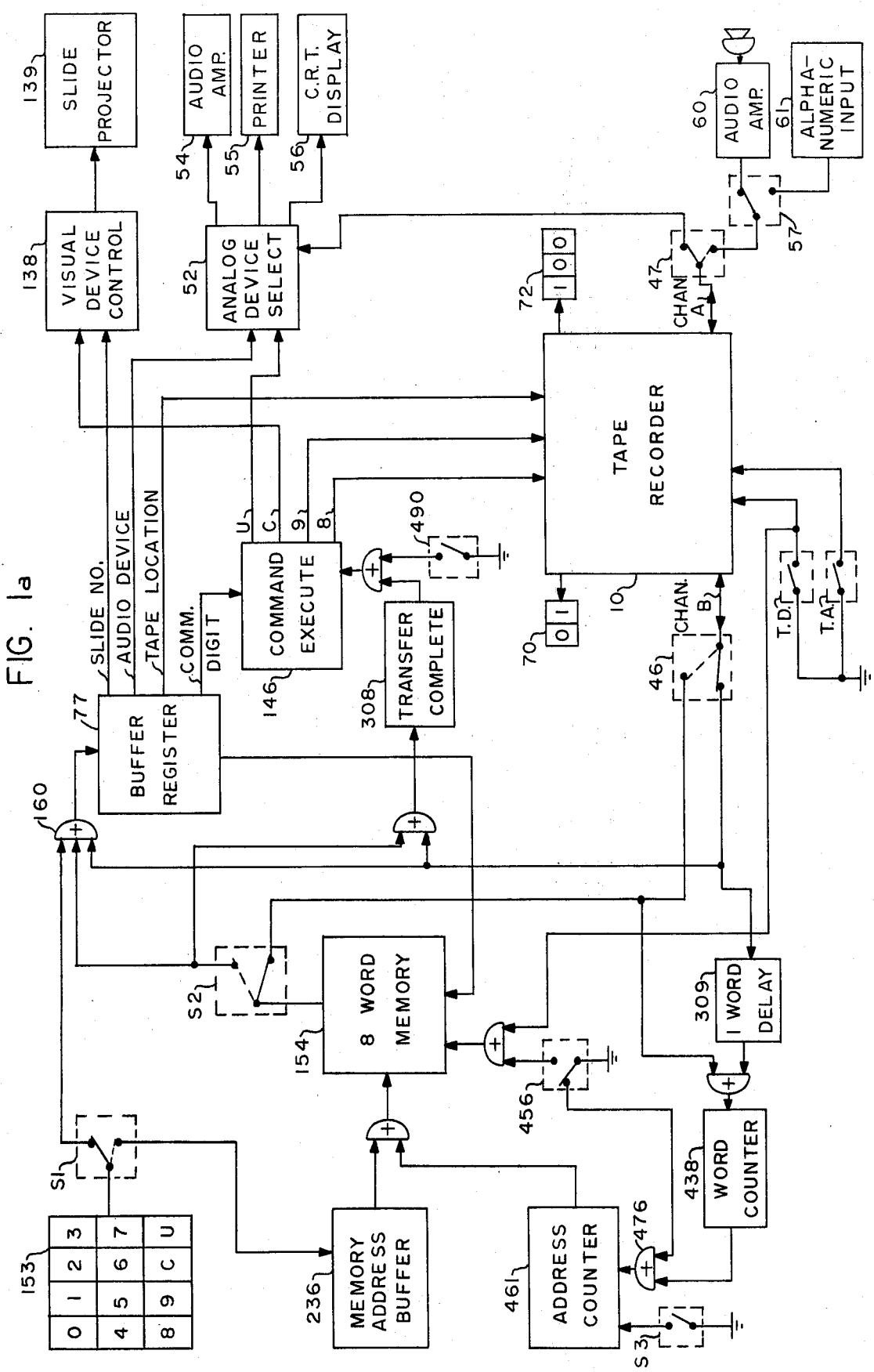

Once power is applied to the system, all logic elements are reset to the appropriate steady state condition by turn-on reset circuitry 73 shown in FIG. 2, which includes an integrator circuit 74 connected across the output of a 5V logic power supply, not shown. After a predetermined delay, the voltage across capacitor 75 triggers one shot 76, the output of which, designated trs, resets all flip-flops, registers, and counters to the proper initial state as will be described below with respect to each circuit.

Precise selection of a track and field position is enabled by an appropriate B.C.D. command from command or buffer register 77, to be described. A command is strobed into B.C.D. to analog converters 78 and 80, respectively, by the output of one shot 81 upon the receipt of a "go to" signal at the input, being connected to the set output SO of "go to" flip-flop 82 of recorder control 83 (FIG. 4). The reset output RO of flip-flop 82 energizes motor control relay 85 through relay driver 86. Track select B.C.D. to analog converter 78 is a 2 digit converter and contains a number which represents one of tracks 0 through 81 decimal, or (0000) (0000) through (1000) (0001) B.C.D., respectively. This B.C.D. number is converted to an equivalent resistance at the output of converter 78 which is connected as one leg of conventional bridge circuit 87.

The opposite leg of bridge 87 is formed by potentiometer 90, the wiper of which is mechanically coupled to head carrier 32. The two remaining legs of the bridge are formed by equal resistors 92 and 94. The two lateral points of the bridge are connected, through resistors 88, between +V and −V power sources. An output from upper point 95 is coupled as an input to amplifier 96 and as one input 97 of "on" position detect 98. The opposite point 99 of bridge 87 is connected to common ground 100.

The output of amplifier 96 is connected as a control input to bi-polar switch 102, the movable arm of which is normally in the center position as shown in FIG. 4, being connected through contacts 104 of relay 85 to one power lead of motor 37 and solenoid clutch 35. The opposite power leads of motor 37 and solenoid clutch 35 are connected to common ground 100. A positive output of amplifier 96 connects contact 106, and a negative output connects contact 108 to the movable arm of switch 102. Accordingly, a (+) or (−) voltage is applied to motor 37, which causes it to rotate in the appropriate direction so as to position record heads 28 and 30 to a selected track position wherein the resistance of potentiometer 90 is equal to the resistance at the output of B.C.D. to analog converter 78.

Bridge 87 is of course then balanced and a zero voltage from point 95 is coupled as one input 97 of "on position" detect 98, to be described.

It is readily seen from the above description that bridge 87, amplifier 96, and motor 37 are connected in a servo loop configuration, and that the input to this loop is provided by the output of B.C.D. to analog converter 78 while the feedback signal is provided by potentiometer 90.

A similar servo loop, which is adapted to position tape 13 to any selected field position of each of tracks 0 through 81 includes a similar bridge 110. The top point 95 of bridge 110 is connected as an input to amplifier 112 and as a second input 114 of "on position" detect 98. The output of amplifier 112 is connected to the junction of series connected diodes 116 and 118, the output leads of which are connected to one lead of relays 120 and 122 through contacts 124 and 126, respectively, of motor control relay 85. The opposite power leads of relays 120 and 122 are connected to common ground 100.

A positive voltage is selectively connected through the normally open contacts 127 and 128 of relays 120 and 122, respectively, and to one power lead of each of solenoid clutches 25 and 27, respectively. The second power lead of each of the above mentioned motors and solenoids are connected to common ground 100.

Field select B.C.D. to analog converter 80 is a three-digit converter which outputs a discrete resistance which is representative of one of field positions 0 through 999 decimal or (0000)(0000)(0000) through (1001)(1001)(1001) B.C.D.

Upon the occurrence of a "go to" signal, as described above, the three-digit B.C.D. number indicative of a selected field position is strobed into B.C.D. to analog converter 80 by the output of one shot 81.

A negative output of amplifier 112 energizes relay 120 and a positive output energizes relay 122. Accordingly, motor 24 or 26 respectively, is caused to rotate in the appropriate direction and thus drive tape 13 to a selected field position while driving potentiometer 90 in order to balance bridge 110. Once the tape is on position, a zero signal at output 95 of bridge 110 enables input 114 of "on position" detect 98.

Upon the receipt of a zero signal at both inputs 97 and 114, an output of "on position" detect 98 triggers one shot 129, the output of which is connected to reset input "rs" of "go to" flip-flop 82 and "stop" flip-flop 130. The output of one shot 129 also triggers forward flip-flop 84, through input 132 of AND gate 134 having an output connected to input 135 of OR gate 137. This event enables forward drive motor 18, in a manner to be further described, which drives tape 13 forward, beginning at the selected track and field locations.

Audio-visual control 136 includes B.C.D. to decimal converter 138 which converts two B.C.D. digits from buffer register 77 to a decimal output which selects any of 80 slides of a conventional random access slide projector 139.

A second B.C.D. to decimal converter 52 converts one B.C.D. character to a decimal output which selectively gates output line 51 of audio channel A to the input of audio amplifier 54, printer 55 or C.R.T. display 56, as previously described.

B.C.D. instructions contained in the lower 5 digits of buffer register 77 are selectively routed in response to alphanumeric command digit 144, which is the uppermost digit of register 77.

Only four commands are required in this embodiment of the invention, which are a "go to", unconditional "stop", "slide select", and "audio device select", and are represented by alphanumeric characters (8)1000, (9)1001, (C)1010, (U)1011, respectively.

Command digit 144 is coupled in four bit binary form as an input to binary to alphanumeric converter 146. Converter 146 outputs an 8, 9, C or U command in response to an output of OR gate 147 coupled to input 148. Upon the receipt of an 8, 9, C, or U command to alphanumeric converter 146, the system executes a "go to", stop, slide select, or audio select command, respectively, in response to an "execute" signal applied to OR gate 147, in a manner to be described.

Digital information in the form of a 6 digit alphanumeric word is entered into buffer 77 in serial mode either from digital input 152 (FIG. 1), memory 154 (FIG. 3), or tape 13 (FIG. 4), in a manner to be described, and in a format as illustrated below.

| ALPHANUMERIC | MSD 0010 | 0000 | 1001 | 0111 | 0110 | LSD 1000 |
|---|---|---|---|---|---|---|

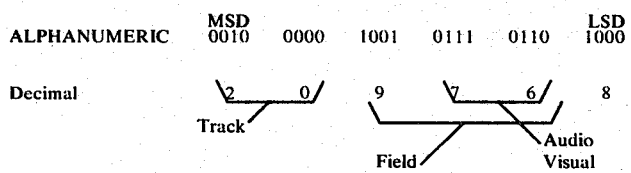

The above word is shown as it would appear when stored in buffer register 77 (FIG. 4) or memory 154 (FIG. 3), to be described, or as displayed by conventional B.C.D. to decimal decode and display 156 (FIG. 4).

The least significant digit, 8, is command digit 144, previously mentioned, and is coupled as an input to decode and display 156, and to alphanumeric command decoder 146.

The next three more significant digits, 6, 7, and 9, respectively, are coupled through decode and display 156 as inputs to field select B.C.D. to analog converter 80 and the 6 and 7 digits are further connected as inputs to slide projector control decoder 138, the output of which selects one of 88 slides of slide projector 139. The least significant of the three, digit 6, is also further coupled as an input to audio output device select decoder 52.

The two most significant digits, 0 and 2, of buffer register 77, are coupled through decode and display 154 as inputs to track select B.C.D. to analog converter 78 only.

Serial data is selectively loaded into buffer 77 through OR gate 160 (FIG. 3), having an output coupled through common terminal E to input 161 of buffer 77. It is loaded either from digital input 152 (FIG. 1), memory 154 (FIG. 3), or tape 13 (FIG. 4), as mentioned above. Data is shifted into buffer 77 by appropriate shift clock pulses which are selectively gated into buffer 77 through a second OR gate (FIG. 3), having an output connected through common terminal D to input 163 of buffer 77.

Digital input 152 (FIG. 1), includes keyboard 153, which is provided with 12 push buttons, each of which operates a single normally open switch, not shown. These switches are coupled to a matrix, not shown, in a manner well known in the art, to output a parallel alphanumeric 1, 2, 4, 8 code as shown in FIG. 1.

Detect entry gate 164 produces an output pulse when any button is operated, which is coupled to set input S of flip-flop 166. Set output SO of flip-flop 166 is connected as an enable input 168 of AND gate 170, a second input 172 of which is coupled to the output of master clock 174.

The output of AND gate 170 thus gates clock pulses to the input of "count to 4" counter 176 and to inputs 178 and 180 of AND gates 182 and 184, respectively.

Counter 176 outputs four discrete sequential counts 0 through 3 which are internally gated to scan the 1, 2, 4, and 8 output lines, respectively, of a keyboard matrix, not shown, in order to convert parallel B.C.D. Serial data is then coupled from the output of converter 186 to inputs 188 and 190 of AND gates 192 and 194, respectively.

The number 3 line of counter 176, which is the fourth count, is coupled to the trigger inputs of one shots 195 and 196, respectively, which is triggered at the end of each scan of the matrix.

Figure 3:
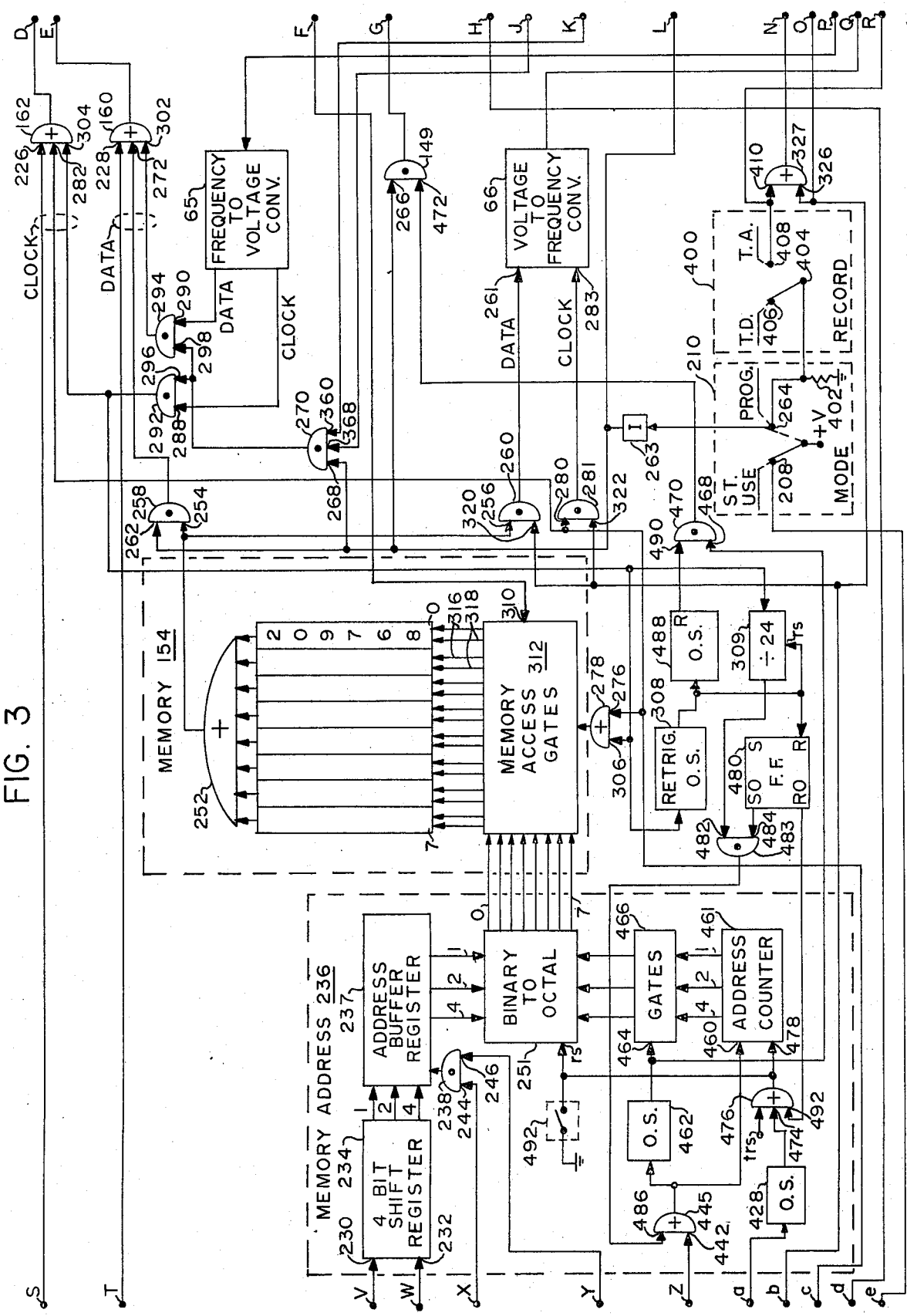

The output of one shot 195 is coupled to reset input R of flip-flop 166 and the output of one shot 196 is connected as one input 198 of AND gate 200 of memory read-write control 199, to be described, and to the input of divided by 6 divider 201, having an output connected to reset input R of input select flip-flop 202. Enable input 204 of AND gate 200 is coupled, through common terminal e, to contact 208 of mode select switch 210 (FIG. 3). Enable inputs 212 and 214 of AND gates 194 and 184, respectively, are coupled to set outputs SO of flip-flop 202, which is also further coupled through inverter 217 to inputs 218 and 220 of AND gates 192 and 182, respectively. Set input S of flip-flop 202 is connected to the stationary contact of switch 221 which is further connected to input 222 of OR gate 223, having an output connected to reset input 224 of divide by 6 divider 201. The movable arm of switch 221 is connected to common ground 100.

The outputs of AND gates 184 and 194 are coupled through common terminals S and T, respectively, to inputs 226 and 228 of OR gates 162 and 160, respectively (FIG. 3). A 6 digit command word is loaded into buffer register 77 as follows: Register select switch 221 is momentarily operated to set flip-flop 202. Set output SO of flip-flop 202 enables AND gates 184 and 194. Each digit is then entered into keyboard 153 in the order of descending powers.

As each digit is entered, an output of "detect entry" 164 sets flip-flop 166, the set output SO of which enables AND gate 170, wherefrom clock pulses are coupled to counter 176 and to AND gates 184 and 182. Counter 176 outputs four counts, converting parallel alphanumeric data to a serial format, each bit being coupled through AND gate 194 through terminal T, FIG. 3, and OR gate 160, thence through terminal E to data input 161 of buffer 77, FIG. 4.

One shots 195 and 196 are triggered by the fourth count output of counter 176. An output of one shot 195 resets flip-flop 166 inhibiting AND gate 170. An output of one shot 196 steps divide by 6 divider 201 by one count.

When six entries have been completed, as described above, an output of divide by 6 divider 201 resets flip-flop 202 inhibiting AND gates 184 and 194. AND gates 182 and 192 are then enabled by an output of inverter 217. A digital command is transferred from a selected address 0 through 7 of memory 154 in accordance with a selected entry of 0 through 7 into keyboard 153 as follows: The outputs of AND gates 182 and 192 are connected through common terminals V and W to inputs 230 and 232, respectively, of four bit shift register 234 of memory address 236 (FIG. 3). The three least significant digits 1, 2 and 4 of four bit shift register 234 are coupled as an input to address buffer register 237. The output of shift register 234 is strobed into address buffer 237 by an output of AND gate 238. Input 244 of AND gate 238 is connected through common terminal X to the output of inverter 217 (FIG. 1). A second input 246 of AND gate is connected through common terminal Y as one output of AND gate 200, which is also connected as one input 248 of OR gate 250. Once the desired address is entered into keyboard 153, data input 152 outputs four clock and four data bits which are coupled through AND gates 182 and 192, respectively. Data is thus loaded into four bit shift register 234. An output of one shot 196 is coupled through input 198 of AND gate 200, one output of which strobes the three least significant digits of shift register 234 into memory address buffer register 237. The binary outputs of buffer register 237 are coupled as inputs to binary to octal converter 251, which outputs the selected address 0 through 7 to memory 154. Data from the selected memory register is then transferred into buffer register 77 (FIG. 4), as follows: The output of OR gate 252 of memory 154 is connected to inputs 254 and 256 of AND gates 258 and 260, respectively. Input 262 of AND gate 258 is enabled by the output of inverter 263, which is also further connected as an inhibit to input 266 of AND gate 149, having an output connected through common terminal G to input 267 of OR gate 147. The output of inverter 263 is also coupled to input 268 of AND gate 270. A fourth output of inverter 263, the input of which is connected to contact 264 of mode switch 210, is coupled through common terminal L to input 133 of AND gate 134 (FIG. 4). The output of AND gate 258 is connected to input 272 of OR gate 160. Shift clock pulses which shift information from memory 154 are gated through terminal c of memory read-write 199 (FIG. 1), from the output of AND gate 274, which is connected as one input 276 of OR gate 278, to one input 280 of AND gate 218, and to input 282 of OR gate 162. Accordingly, when AND gate 274 (FIG. 1) is enabled by the set output of flip-flop 284, clock pulses are gated through OR gate 278 (FIG. 3), which shifts information from memory 154, in a manner to be further described, and supplies a train of clock pulses through AND gate 162 and common terminal D to clock input 163 of buffer 77 (FIG. 4). Data from memory 154 is thus transferred through OR gate 252 and AND gate 258 to input 272 of OR gate 160, which is coupled through common terminal E to data input 161 of buffer register 77.

Recorded digital information from channel B of tape recorder 10 (FIG. 4), is retrieved by record-playback head 28 and is coupled through the normally closed contacts of switch 46 which is connected through common terminal P to the input of frequency to voltage converter 65. This information in the form of a composite clock and data signal which has been previously recorded in the form of tones of different frequencies, is processed by frequency to voltage converter 65 and coupled in the form of separate clock and data signals to inputs 288 and 290 of AND gates 292 and 294, respectively. Inputs 296 and 298 of AND gates 292 and 294, respectively, are enabled by the output of AND gate 270, and is enabled in a manner to be further described. The output of AND gate 294 is connected to input 302 of OR gate 160. Clock signals at the output of AND gate 292 are gated to input 304 of OR gate 162 and as one input 306 of OR gate 278, being also further fed as an input of retriggerable one shot 308. Each word thus stored in buffer 77 is selectively transferred to a particular memory location 0–7 as follows: The output of buffer 77 is connected through common terminal F to data input 310 of memory access gates 314, FIG. 3. Input 310 of memory access gates 312 is internally connected as one input of eight AND gate, not shown, which are selectively enabled by an output 0–7 of binary to octal converter 251. The outputs of these eight gates are then coupled as data input line 316 to each of eight memory registers 0–7, respectively. The output of eight separate AND gates which are also selectively enabled by an output 0–7 of binary to octal converter 314 and the outputs of which are connected to a clock input line 318 of each of memory locations 0–7, respectively. Once information is stored in memory 154, it may then be selectively transferred to tape as follows: The output of memory OR gate 252 is coupled as one input 256 of AND gate 260, the output of which is coupled as a data input 261 of voltage to frequency converter 66. Clock pulses from the output of AND gate 274 of memory read-write control 199 (FIG. 1), are coupled through common terminal c to input 280 of AND gate 281, the output of which is coupled to clock input 283 of voltage to frequency converter 66. Inputs 320 and 322 of AND gates 260 and 261 are connected through common terminal b to the output of inverter 324 of data to tape control 325 (FIG. 1), which is also connected to input 326 of OR gate 327 and through common terminal 0 and line 67 to the control inputs of switches 46 and 42 of tape recorder 10 (FIG. 4). The output of voltage to frequency converter 66 is coupled through common terminal Q to the normally open contacts of switch 46. Thus, upon the occurrence of a tape data command, to be described, normally open contacts of switch 46 are closed and digital information from voltage to frequency converter 66 is recorded in channel B of a selected track 0–81, FIG. 4. Tape 13 is driven forward during record and playback intervals by synchronous forward drive motor 18 (FIG. 4) which is automatically controlled by forward drive flip-flop 84 as follows: Set output SO of forward drive flip-flop 84 is connected to input 328 of OR gate 330 having an output connected to input 332 of AND gate 334. A second input 336 of AND gate 334 is connected to reset output RO of stop flip-flop 130. The output of AND gate 334 is coupled through relay driver 340 to the upper lead of relay 342, the lower lead of which is connected to common ground 100. One terminal of 120 volt A.C. line is coupled through normally open contacts 344 of relay 342 to one power lead of motor 18 and solenoid clutch 16. 181 The opposite power leads of solenoid clutch 16 and motor 18 are connected in parallel and to the opposite terminal of 120 volt A.C. input. Flip-flop 84 is manually set by momentary switch 348 connected to input 350 of OR gate 137 and is manually reset by reset switch 352 connected to input 354 of OR gate 356. It is automatically reset by set output SO of "go to" flip-flop 82 connected to input 358 of OR gate 356. Set output SO of flip-flop 82 is also further connected through terminal K to input 360 of AND gate 270 (FIG. 3). Tape 13 and head carrier 32 of tape recorder 10 are automatically positioned to a selected field and track position, respectively, under the control of "go to" flip-flop 82 as follows. The 8 or "go to" output signal of alphanumeric converter 146 is coupled to input 362 of OR gate 364 having a second input 365 connected through momentary switch 366 to ground. The output of OR gate 364 is connected to the set input S of "go to" flip-flop 82. Set output SO of "stop" flip-flop 130 is connected through inverter 255 to the reset input R of flip-flop 82, and through common terminal J to input 368 of AND gate 270 (FIG. 3). Set output SO of flip-flop 82 is connected to the input of one shot 81 which as previously described is connected to the strobe inputs st of B.C.D. to analog converters 78 and 80, respectively. Reset output RO of "go to" flip-flop 82 is connected through relay driver 86 to one lead of relay coil 85, the opposite lead of which is grounded. Accordingly, upon the occurrence of an 8 command pulse from the output of binary to alphanumeric converter 146, "go to" flip-flop 82 is set and an output of one shot 81 strobes track and field information from buffer 77 into B.C.D. to analog converters 78 and 80, respectively. Reset output RO of flip-flop 82 energizes relay 85. The normally open contacts 104, 124 and 126 of relay 85 are closed and power is selectively supplied to track select drive motor 37 by switch 102, and through relays 120 and 122 to tape position motors 24 and 26, respectively. An unconditional "stop" command is executed by "stop" flip-flop 130, the set input S of which is connected to the output of OR gate 372. Input 370 of OR gate 372 is connected to the 9 command output of binary to alphanumeric converter 146. A second input 374 of OR gate 372 is connected through momentary switch 376 to ground. Reset input R of stop flip-flop 130 is connected through common terminals H and d (FIG. 3) to the outputs of AND gates 378 and 380 of memory read-write control 199 (FIG. 1) for a purpose to be further described. Reset output RO of stop flip-flop 130 is connected to input 336 of AND gate 334 as previously mentioned.

This system is designed to operate in two distinct modes of operation which are "student use mode" and "program mode", as determined by mode switch 210 (FIG. 3). In the programming mode, analog or digital data may be recorded in channels A and B, respectively, of a selected track as determined by the position of record select switch 400. Contact 264 of mode switch 210 is connected through resistor 402 to ground and to the movable arm 404 of record select switch 400. No connection is made to contact 406 of record select 400. Contact 408 is connected to input 410 of OR gate 327 and to the control input of switches 47 and 43, respectively.

Accordingly, when mode switch 210 is positioned to the program mode of operation, a positive voltage is applied through movable arm 404 and contact 408 to energize switches 47 and 43. Switch 47 connects record-playback lead 45 of tape recorder 10 to the movable arm of analog input switch 57. A 54 KHz bias signal is coupled from bias oscillator 38 through switch 43 to input lead 41 of record head 30. An output of OR gate 327 (FIG. 3) is connected through common terminal N and through the normally closed contacts 414 of relay 85 to bias enable input 418 of bias oscillator 38. A second output of OR gate 327 is connected to input 329 of OR gate 330. Accordingly, at any time a "go to" command is initiated contacts 414 are opened to disable bias oscillator 38. Bias oscillator 38 is disabled in order to prevent the inadvertent destruction of previously recorded analog and digital information of tape 13.

The transfer of a single word or all eight words from memory to tape is enabled by data to tape control 325 (FIG. 1). Data to tape control 325 includes flip-flops 411 and 413 which are designated as "tape data" and "tape data all" flip-flops, respectively. Set inputs S of flip-flops 411 and 413 are connected through switches 415 and 417 respectively to ground. Set outputs SO of flip-flops 411 and 413 are connected to inputs 419 and 420, respectively, of OR gate 422 and the set output SO of flip-flop 413 is further connected to input 424 of AND gate 378 of read-write control 199 and through inverter 425 to input 427 of AND gate 380. The output of OR gate 422. is connected as an input to amplifier 324, as an input to one shot 426 and through common terminal $a$ to the input of one shot 428 of memory address 236 (FIG. 3). The output of amplifier 324 is connected through common terminal $b$ (FIG. 3) to the enable inputs 320 and 322 of AND gates 260 and 281 respectively, which enable data and clock pulses to be gated into voltage to frequency converter 66. The output of amplifier 324 is also connected to input 326 of OR gate 327, and through common terminal 0, to the control inputs of switches 46 and 42. Once drive motor 18 is energized, a delayed output of one shot 426 of data to tape control 325 (FIG. 1) enables memory read-write control 199 to output a train of clock pulses which shift data from memory 154 to tape 13 and which also provides sequential addressing to memory 154 as follows: An output of one shot 426 is connected to input 430 of OR gate 250, having an output connected to the set input of control flip-flop 284. Set output SO of flip-flop 284 is connected to input 432 of AND gate 274 which has a second input 436 connected to output CL of master clock 174 of digital input 152. The output of AND gate 274 then supplies clock pulses to the count input of divide by 24 bit counter 438 and through common terminal $c$ to input 276 of OR gate 278 (FIG. 3), being also further connected to input 280 of AND gate 281 and input 282 of OR gate 262. Accordingly upon the initiation of a "tape data" command, an output of one shot 426 sets control flip-flop 284. Clock pulses are thereby gated through AND gate 274 which step divide by 24 bit counter 438 and, through common terminal $c$, to input 276 of OR gate 278 (FIG. 3), which shift a selected word from memory 154 to tape 13 (FIG. 4). The output of divide by 24 bit counter is connected to input 440 of AND gate 380, through common terminal Z to input 442 of OR gate 445 (FIG. 3) and as a count input to divide by 8 word counter 443 (FIG. 1). The output of divide by 8 word counter is in turn connected to input 444 of AND gate 378. The parallel connected outputs of AND gates 378 and 380 are connected to input 446 of OR gate 448 as an input to one shot 450, to the reset input $rs$ of control flip-flop 284 and through common terminals $d$ and H (FIG. 3) to the reset input R of stop flip-flop 130 (FIG. 4). The output of OR gate 448 of data to tape control 325 is connected to the reset input $rs$ of flip-flops 411 and 413. The output of one shot 450 is connected as one input 452 to OR gate 454 having an output connected to the reset inputs of divide by 8, word counter 443 and divide by 24 bit counter 438. Thus at the end of each word time or eight word times, flip-flop 411 and 413 of data to tape control 325, and control flip-flop 284 of memory read-write control 199 are reset. An output of one shot 450 resets counters 438 and 443. A fourth output of AND gates 378 and 380 applies a reset pulse through common terminals "d" and H, FIG. 3, to stop flip-flop 130 (FIG. 4). Load memory switch 456 is connected to input 458 of OR gate 250 and enables the transfer of the contents of buffer 77 (FIG. 4) to memory 154 (FIG. 3). The output of OR gate 445 of memory address 236 (FIG. 3) is connected to the count input 460 of address counter 461 and as an input to one shot 462. The output of one shot 462 is in turn connected as a strobe pulse to input 464 of gates 466 being also further connected to input 468 of AND gate 470. The output of AND gate 470 is connected to input 472 of AND gate 149 which, as previously mentioned, provides an output which strobes a command digit of buffer 77 into binary to alphanumeric converter 146. Memory 154, FIG. 3, is sequentially addressed by address counter 461, the 1, 2 and 4 binary outputs of which are strobed through gates 466 to corresponding inputs of binary to octal converter 251. Thus, at the end of each word time, address counter 461 is stepped by one count which is then strobed by an output of one shot 462 into binary to octal converter 251. The output of one shot 428 of memory address 236 is connected to input 474 of OR gate 476, an output of which is connected to reset input 478 of address counter 461. Accordingly, address counter 461 is reset upon the initiation of either a tape data or tape data all command.

In the student use or playback mode of operation, clock and data signals from tape 13 (FIG. 4), are coupled through frequency to voltage converter 65 (FIG. 3) and through AND gates 292 and 294, respectively, which gate the information through OR gates 162 and 160, respectively, to the clock and data inputs of buffer 77 (FIG. 4). A delay of one word time is provided which permits the one word or first word of a group of words from the tape 13 to be loaded into buffer 77 before it is stored in location O of memory 154. Clock pulses from AND gate 292 are coupled to the input of divide by 24 divider 308 which cooperates with flip-flop 480, to gate the appropriate address to memory 154 upon receipt of information from buffer 77. The output of divide by 24 divider is coupled to set inputs of flip-flop 480 and as one input 482 of AND gate 483. A second input 484 of AND gate 483 is enabled by the set output SO of flip-flop 480. The output of AND gate 483 is coupled as one input 486 of OR gate 445. Reset input RO of flip-flop 480 and reset input rs of divide by 24 divider 309 are coupled to the output of retriggerable one shot 308. Reset output RO of one shot 488 is coupled as an inhibit to one input 490 of AND gate 470. Retriggerable one shot 308 outputs a pulse at the end of each single word, or each sequential group of 8 words, received from tape 13 which triggers conventional one shot 488. At the end of the first word time, an output of divide by 24 divider 309 sets flip-flop 480, enabling input 482 of AND gate 483. Reset output RO of flip-flop 480 resets address counter 461 to zero. During the next word time, a digital word stored in register 77 is transferred into zero location of memory 154. Upon the completion of the first word, an output of divide by 24 divider 309 steps address counter 461 to location 1 of memory 154. One shot 308 senses the end of a word or eight words and outputs a pulse which resets flip-flop 480 and divide by 24 divider 309, thus ending one transfer cycle of digital information from tape 13 to buffer 77 to memory 154. An output of AND gate 470 strobes a command digit into alphanumeric converter 146. Signal flow for this function will be described more fully below with respect to operation of the system.

OPERATION

A lecture to be recorded is first organized into the form of a manuscript. Appropriate slides and text copy to be presented during the course of the lecture are indicated at the desired times to be shown.

Typically, the lecture will be recorded in two separate steps. First, the audio portion is recorded in channel A of the required number of tracks. When this is complete, it will be played back and the instructor will record the necessary digital information in the adjacent channel "B" of each track at the appropriate track location.

Accordingly, tape recorder and visual device control commands are then permanently associated with the audio portion of the program.

For the purpose of illustration, it is assumed that the instructor wishes, during a lecture, to pose certain questions which require a response from the student. Accordingly, certain tracks and field locations are designated as branch locations to which the student will be automatically directed, depending upon the student's answer to a true-false or multiple choice question, posed or presented during or at the end of a lecture or portion of a lecture.

For the purpose of this description, it is assumed that there is no information on tape 13 (FIG. 4) and that a lecture will be recorded beginning in channel A of track zero and at field location zero which, of course, as previously described, is the first field position of each track.

Head carrier 32 (FIG. 4) and tape 13 are positioned to the desired track and field locations respectively, by an appropriate command word which is loaded in to buffer register 77 from keyboard 153. This command word includes a desired track and field location in the first five most significant digits of buffer register 77 and includes a command digit 8 which is the least significant digit 144 of buffer register 77. The current track and field position of head carrier 32 and tape 13 is displayed by digital readouts 70 and 72, respectively. In order to record analog information the movable arm of mode switch 210 is first operated to the dotted line or program position as shown in FIG. 3. A positive voltage is then connected through contact 264 of switch 210 and through inverter 263 which inhibits AND gates 258, 270, 134 and 149. A positive voltage is also applied to movable arm 404 of record select switch 400 which is temporarily positioned to the "tape data" position or contact 406 of switch 400. Before taping the lecture, as previously mentioned, an appropriate "go to" command word is loaded into register 77 from digital input 152. This is accomplished as follows. Register select switch 221 (FIG. 1) is momentarily closed to set flip-flop 202 and to reset divide by 6 divider 201. The set output SO of flip-flop 202 enables inputs 214 and 212 of AND gates 184 and 194, respectively. Since it is desired to position the tape at field position 0 of track 0, the command word would consist of the following digits 00, 000, 8. The word is then entered into keyboard 153 in the order of descending powers. As each digit is entered, the following series of events effect a transfer of the command word into buffer 77 in a serial format as follows: The most significant zero is entered and a pulse from keyboard 153 triggers detect entry 164, the output of which sets flip-flop 166. Set output SO of flip-flop 166 enables input 168 of AND gate 170 gating clock pulses to the input of counter 176 and to inputs 180 and 178 of AND gates 184 and 182, respectively. As four clock pulses are gated through AND gate 184 and common terminal S, FIG. 3, to input 226 of OR gate 162, count to 4 counter 176 outputs counts 0–3 to interrogate, sequentially, each of 1 2, 4 and 8 output lines of keyboard 153. Parallel to serial converter 186 outputs four serial data bits to inputs 190 and 188 of AND gates 194 and 192, respectively. The output of AND gate 194 is coupled through common terminal T to input 228 of OR gate 160, FIG. 3, having an output coupled through terminal E, FIG. 4, to data input 161 of buffer register 77. The four clock pulses are gated from the output of OR gate 162 through terminal D, FIG. 4, to input 163 of buffer 77. Thus at the end of four clock pulses, the first four bits of the command word are now stored in the least significant position 144 of buffer 77. The next five more significant digits of the command word are now entered in keyboard 153 and are shifted into buffer register 77, as described above. When the least significant, or 8 digit, is transferred, divide by 7 divider 201 is reset by an output of one shot 196. The output of divide by 6 divider 201 in turn resets register select flip-flop 202 to inhibit AND gates 184 and 194, respectively. Once the command word has been entered, buffer register 77 now reads 00 track location, 000 field location, and an 8 in the command bit position 144. In order to initiate a "go to" command which positions the tape to the desired selected location, switch 490, FIG. 4, of tape recorder control is momentarily closed and an output of OR gate 147 strobes command digit 144 into binary to alphanumeric converter 146. A pulse at the 8 output of alphanumeric converter 146 is applied to input 362 of OR gate 364, the output of which sets "go to" flip-flop 82. Set output SO of "go to" flip-flop 82 triggers one shot 81, the output of which is coupled to the strobe inputs st of B.C.D. to analog converters 78 and 80, respectively. Accordingly, zero track and zero field locations are gated into converters 78 and 80, respectively, the outputs of which are connected as one leg of bridge circuits 87 and 110, respectively. Reset output RO of flip-flop 82 energizes relay 85 through relay driver 86. Normally open contacts 104 of relay 85 are closed, connecting one power lead of motor 37 and clutch 35 to the movable arm of switch 102. Normally open contacts 124 and 126 of relay 85 are closed connecting one lead of relays 120 and 122, respectively, to diodes 116 and 119, respectively. A plus or minus voltage is coupled through switch 102 to motor 37 which is driven in a direction to move head carrier 32 to the appropriate selected track position. Motor 37 drives potentiometer 90 in a direction to balance bridge 87. Once bridge 87 is balanced, a zero output from terminal 95 of bridge 87 is coupled to input 97 of "on position" detect 98. In addition, an unbalanced output from terminal 95 of bridge 110 is coupled through amplifier 112 to the appropriate relay 120 or 122 to drive motor 24 or 26, respectively, which positions tape 13 to the selected field location. Potentiometer 90 of bridge 110 is driven to balance bridge 110, which when balanced, provides a zero input from terminal 95 to input 114 of "on position" detect 98. Once head carrier 32 and tape 13 are positioned to zero track and zero field positions, an output of "on position" detect 98 triggers one shot 129 which applies a reset pulse to reset input R of stop flip-flop 130, auxiliary reset input rs. of "go to" flip-flop 82, and applies a start trigger pulse to input 132 of AND gate 134. Upon the initiation of any "go to" command, contacts 414 of relay 85 are opened to inhibit input 418 of bias oscillator 38 in order to prevent inadvertent destruction of information previously recorded on tape 13. Record select switch 400, FIG. 3, is now operated to the tape analog position designated T.A. A positive voltage from contact 264 of mode switch 210 is coupled through movable arm 404 of record select switch 400 to input 410 of OR gate 327 and through common terminal R, FIG. 4, to the control inputs of switches 43 and 47 One output of OR gate 327 is coupled through common terminal N to input 329 of OR gate 330. The output of OR gate 330 enables input 332 of AND gate 334, the output of which energizes forward drive control relay 342 through relay driver 340: 120 volts A.C. is now applied through contacts 344 of relay 342 to forward drive motor 18 and solenoid clutch 16. A second output of OR gate 327 is coupled through common terminal N and contacts 414 of relay 85, FIG. 4, to enable input 418 of bias oscillator 38. A 54 KHz bias signal is then fed through switch 43 to bias-erase lead 41 of record head 30. Record-playback lead 45 of record head 30 is now coupled through switch 47 to the movable arm of switch 57. Contact 58 of record input select switch 57, as shown in FIG. 4, is coupled to the output of audio amplifier 60. Accordingly, the audio portion of the lecture may be recorded in the form of voice or music, by a conventional microphone tape recorder, etc., now shown, are connected as an input of audio amplifier 60. Alphanumeric information in the form of frequency shift or multiple tones in the audio frequency range may be selectively fed from alphanumeric source 61 into record head 30 through audio input select switch 57. Upon the completion of approximately 22 minutes of recording in track zero, tape 13 is stopped by positioning record select switch from the tape analog position, T.A., to the tape data position, T.D. This action de-energizes forward drive relay 342 to stop tape 13. Assuming the audio portion of the lecture is to be continued in the adjacent track 1, an appropriate command word is once again loaded into buffer register 77, which will reposition the tape 13 to field position 0 of track 1. The command word contains the following digits, 01, 000, 8, and would be serially fed into buffer 77, as previously described, from keyboard 153. Switch 221 (FIG. 1) is again operated to set register select flip-flop 202. The set output of flip-flop 202 enables AND gates 184 and 194. The command word shown above is then entered into keyboard 153 in order to descending powers as before. Upon the loading of the final digit, information in buffer register 77, reading from bottom to top, would be 01, 000 and 8 in the command digit position 144. Switch 490 (FIG. 4) is operated to strobe an 8 command digit into binary to alphanumeric converter 146. The output pulse at the 8 output of binary to alphanumeric converter 146 sets "go to" flip-flop 82. Track and field locations are strobed into B.C.D. to analog converter 78 and 80, respectively, and relay 85 is energized to enable track selection motor 37 and field select motors 24 and 26, respectively. Accordingly, tape 13 is repositioned to field position 0 of track 1 whereupon an output of on position detect 98 triggers one shot 129, the output of which resets "go to" flip-flop 82. Record select switch 400, FIG. 3, is operated to the tape analog position and contact 408 of switch 400 supplies a positive voltage through OR gate 327 to input 329 of OR gate 330, FIG. 4. Forward drive motor 18 is thus energized by relay 342. A second output of OR gate 327 supplies a positive voltage through contacts 414 of relay 85 to enable input 418 of bias oscllator 38. Line 62 closes switches 43 and 47 which thus reconnects bias to record head 30 and connects signal lead 45 through switches 47 and 57 to the output of audio amplifier 60. The remainder of the lecture is now completed in channel A of track 1, assuming the lecture is less than approximately 44 minutes. As previously mentioned, throughout the course of the lecture, a notation is made of the exact positions of tape 13 and head carrier 32, as indicated by digital readouts 70 and 72 respectively, at which slides are to be shown on hard copies and C.R.T. displays provided. A notation is also made of the exact points where a response is expected from the student. This is done in order to facilitate repositioning of head carrier 32 so that digital instructions may later be recorded beginning at the appropriate location within the body of the lecture. Once the audio portion of the lecture is completed, record select switch 400 (FIG. 3) is operated to the tape data position which stops drive motor 18, in a manner as previously described. Switches 43 and 47 of tape recorder 10 return to the position shown in FIG. 4 wherein bias from bias oscillator 38 is removed from record head 30 and audio output lead 45 is connected as an input of B.C.D. to decimal converter 52. Audio output from playback head 30 is thus selectively coupled to audio amplifier 54, printer 55 or C.R.T. 56. For the purpose of illustration, it is assumed that certain slides are to be shown during the lecture. As previously mentioned, a notation was made by the instructor of the exact location where these slides are to be shown. Accordingly, tape 13 and head carrier 32 are first positioned to each selected location as noted by the instructor as follows. Assuming, for example, that a slide is to be shown in the first track zero at field location 102, then the appropriate command would be 00-102-8 and would be loaded into buffer 77 in a manner previously described from keyboard 153. Switch 221 (FIG. 1) is momentarily closed to set flip-flop 202 which gates information from keyboard 153 into buffer 77, FIG. 4. Once the command has been loaded in buffer 77, switch 490, FIG. 4, is closed to strobe an 8 command into binary to alphanumeric converter 146. Converter 146 then outputs a pulse at its 8 output which sets "go to" flip-flop 82. This event triggers one shot 81 which then gates the appropriate locations into B.C.D. to analog converters 78 and 80, whereupon tape 13 is positioned to the selected track zero and field position 102 locations, respectively. Assumiing slide 12 is to be displayed, the appropriate command word would be 00-012-C. In order to transcribe the command word on tape 13, it is first loaded into buffer 77, then is serially loaded into a location of memory 154, FIG. 3, at an address determined by address counter 461, from whence it may then be transferred onto the selected location of tape 13, FIG. 4. The slide command is first entered into keyboard 153, FIG. 1, and transferred into buffer 77, FIG. 4, in a manner heretofore explained. It is then transferred from the output of buffer 77 through common terminal F, FIG. 3, to data input 310 of memory access gates 312 as follows. Load memory switch 456 of memory read-write control 199 (FIG. 1) is closed and flip-flop 284 is set by an output of OR gate 250. Input 432 of AND gate 274 is enabled and clock pulses from master clock 174 of digital input 152 are gated through AND gate 274 to the input of divide by 24 bit counter 438 and through common terminal c to input 276 of OR gate 278, FIG. 3, to input 280 of AND gate 281 and to input 282 of OR gate 162. Accordingly, clock pulses are fed through OR gate 162 and common terminal D, FIG. 4, to input 163 of buffer 77, and through OR gate 278 to one of selected memory access gates 312, FIG. 3.

Address counter 461 now contains all zeroes as does binary to octal converter 251, having been previously reset by an input of "turn on" reset 73. Thus the word from buffer 77 is transferred into zero location of memory 154. Upon the completion of this transfer, an output of divide by 24 bit counter which is coupled through input 440 of AND gate 380 resets flip-flop 284 to inhibit 432 of AND gate 434. This action terminates the clock pulse train through common terminal c, Fig. 3, to input 276 of OR gate 278 and input 282 of OR gate 162, respectively. A second output of AND gate 380 triggers one shot 450, an output of which in turn resets counters 443 and 438 through input 452 of OR gate 454. A second output of divide by 24 bit counter, coupled through common terminal Z, FIG. 3, to input 442 of OR gate 445, steps address counter 461 up by one count and through an output of one shot 462 gates the up dated count into binary to octal converter 251. The command word is now stored in memory 154 and may then be transcribed on tape 13, FIG. 4, at the previously selected location 102 of track zero. In order to record the word now stored in memory register 0, tape data switch 415 of data to tape control 325, FIG. 1, is closed to set tape data flip-flop 411. The set output of tape data flip-flop 411 is coupled through input 419 of OR gate 422 and amplifier 324 through common terminal b, FIG. 3, to the enable inputs 322 and 320 of AND gates 281 and 260, respectively. It is also further connected to input 326 of OR gate 327, to input 329 of OR gate 330, FIG. 4, and to the control inputs of switches 42 and 46, respectively, of tape recorder 10. Thus the output of OR gate 252 of memory 154, FIG. 3, is connected through input 256 of AND gate 260 to the data input 261 of voltage to frequency converter 66. The output of OR gate 327 is coupled through common terminal N, FIG. 4, and the normally closed contacts 414 of relay 85 to enable input 418 of bias oscillator 38. Input 329 of OR gate 330 is coupled through AND gate 334 and relay driver 340 to energize forward drive relay 342 of tape recorder control 83, and thus apply power to forward drive motor 18. Another output of OR gate 422, FIG. 1, of data to tape control 325 is coupled to the input of 1.5 second delay one shot 426. Thus after 1.5 seconds, when motor 18, FIG. 4, has reached the correct speed for recording, an output of one shot 426 sets clock control flip-flop 284 of memory read-write control and gates clock pulses through AND gate 274 to the input of divide by 24 bit counter 438. A second output of AND gate 274 is coupled through common terminal c, FIG. 3, to the input of OR gate 278 of memory access gates 312 and to input 280 of AND gate 281, the output of which is coupled to the clock input 283 of voltage to frequency converter 66. The output of voltage to frequency converter 66 is connected through common terminal Q, FIG. 4, and switch 46 to record playback lead 44 of digital record head 28. A 50 KHz bias-erase signal is coupled through switch 42 to bias-erase lead 40 of record head 28. With the circuitry thus connected, each clock pulse applied to input 276 of OR gate 278 shifts one bit of information from location 0 of memory 154 through OR gate 252 into voltage to frequency converter 66. At the same time, a clock pulse is fed into voltage to frequency converter 66 from the output of AND gate 281. Voltage to frequency converter 66 converts the data and clock pulses to tones suitable for recording on tape, and outputs a composite signal, including 24 bits of data from command word and 24 clock pulses, which are recorded in location 102 of track 0 of tape 13.

At the end of one word time, an output of 24 bit counter, FIG. 1, again resets control flip-flop 284 through an output of AND gate 380. A second output triggers one shot 450, the output of which resets divide by 8 counter and divide by 24 counter through the output of OR gate 454. A third output of AND gate 380, which is coupled to input 446 or OR gate 448 of data to tape control 325, resets tape data flip-flop 411. Thus, the enable signal which was applied through OR gate 442 and amplifier 324 is removed from AND gates 281 and 260, respectively, FIG. 3, and from the inputs of OR gates 327 and 330, respectively. Accordingly, forward drive relay 342 is deenergized to stop drive motor 18. Switches 42 and 46 return to the condition as shown in FIG. 4. In order to illustrate the operation of audio-visual device control 136, it is assumed that the next portion of the lecture is composed of alpha numeric information which was previously recorded in channel "A" and is to be copied for display to the student by a printer 55 which is connected by B.C.D. to decimal converter 52, to printer 55. The desired command word would be 00-001-U. The letter U of course is a command digit and it provides a pulse at output U of binary to alphanumeric converter 146 which strobes the number listed in the command word shown above into B.C.D. to decimal converter 52 upon being transferred from tape 13 to buffer 77 in the playback mode of operation. Signal flow for this command and all subsequent commands which are to be recorded on tape 13 is identical to that described immediately above and is from keyboard 153 to memory buffer 77 to memory 154 and to voltage to frequency converter 66 then to tape 13. Accordingly, switch 221 (FIG. 1) is closed to set register select flip-flop 202 which enables clock and data signal from digital input 152 to be transferred serially and in groups of 4 binary bits into buffer register 77, FIG. 4. Before any single word command is transferred into memory 154 from buffer 77, reset switch 492 of memory address (FIG. 3) is momentarily closed to reset binary to octal converter 251 and address counter 461 to a zero condition. This insures that each single word command will be transferred into location 0 of memory 154. The transfer of a command word from buffer 77 to memory 154 is initiated by load memory switch 456 of memory read-write control 199, FIG. 1, which sets clock control flip-flop 284. AND gate 274 is enabled and clock pulses are fed through common terminal c, FIG. 3, as shift pulses to OR gate 278 of memory access gates 312 and through input 282 of OR gate 162 to shift information from register 77, FIG. 4. At the end of one word time, an output of divide by 24 divider 438 resets flip-flop 284 to stop the cycle. Once the command word is loaded in memory location 0, it is then transferred to tape 13 at a field location, previously indicated by the instructor, in track 0. At the end of the alphanumeric information which was recorded in channel A and at a field location previously noted by the instructor, it is necessary to record a command which reconnects signal lead 45 of analog head 30 to the input of audio amplifier 54. The command word will be 00-000-U. Once the tape has been positioned to the appropriate location, this command word will then be recorded on tape so that B.C.D. converter 52 is reset to zero. This action connects the output lead 45 of record playback head 30 to the input of the audio amplifier 54. Any further slides or visual aids to be shown throughout that portion of the lecture recorded in channel 0, will be retrieved from tape 13 by a suitable command word placed at the previously noted locations for selecting such aids. When approximately 22 minutes have elapsed, tape 13 will have reached the last field position 999 of track 0 as indicated by digital display 72, FIG. 4. At this position, a "go to" command is recorded which will reposition the tape to 0 field position of the adjacent track 1, wherein as previously mentioned, the lecture is to be completed. This command word will contain track position 01, field position 000, and an 8 command bit. Accordingly, in the playback mode, this command will be routed from tape 13 into buffer 77, wherein it is interpreted as a "go to " command which repositions the tape to track 1 and field position 0. The second portion of the lecture will then be completed in track 1.

Next, as an illustration of the unlimited branching feature of this teaching device, it is assumed that part way into the lecture in channel 1 a question is posed by the instructor which requires a response from the student. It is further assumed that the end of this question occurs at field location 124 and was previously so noted by the instructor. Accordingly, a "go to" command is entered from keyboard 153 to buffer 77, in a manner previously described, and switch 490 (FIG. 4) is closed to strobe the "go to" command into binary to alphanumeric converter 146. This initiates a search cycle of tape recorder control 83 whereby the tape is positioned to field position 124 of track 1. The instructor will then record up to eight possible answers in the form of eight "go to commands" for the aforementioned question, one or more of which may be correct. When the tape is played back in the student use mode of operation to be further described, these commands will be retrieved from tape 13 and sequentially stored in memory locations 0–7. These "go to" commands will be followed by a stop command which will also enable keyboard 153, and permit the student to respond by selecting one of the eight possible answers 0–7 by selecting the appropriate key. In this case, it is assumed that there is only one correct answer. If the student selects this correct answer, the "go to" command containing the present address of tape 13 will be transferred from memory 154 to buffer 77. Upon being interpreted, this "go to" command includes the present location of tape 13 and the lecture is simply continued. If, however, a student selects an incorrect answer, an 8 will be placed in the command bit position which when interpreted, directs the tape to one of seven other selected locations. At each of these seven other locations, the instructor will provide more lecture material and perhaps show further slides, after which the student is again tested by a question. As in the example above, the student may then be directed to go to any of seven other selected locations for further instruction. Or, assuming he selects a correct answer, he may simply be directed back to the main body of the lecture. An essentially unlimited branching facility, to be further described, is provided by this random access control system, being limited only by the capacity of tape 13. As mentioned above, a correct answer to this particular question posed by the instructor will simply cause the tape to continue, beginning at its present location. First, however, the tape is directed by an appropriate "go to" command, to a particular branch address which contains the present address of tape 13. The seven incorrect answers will direct the tape to seven different branch locations. Although these eight commands may be selectively recorded in any strategic locations of tape 13, in order to facilitate logging the addresses, and to shorten the search cycle required to position the tape to a particular location, each command word will be located at field position 0 in each of adjacent tracks 2, 3, 4, 5, 6, 7, 8, and 9. Henceforth, these tracks will be designated as primary branch tape locations, wherein further information will be recorded. Track locations, of course, will be tracks 2, 3, 4, 5, 6, 7, 8, and 9, which will occupy the two most significant digit positions of the command word. Prior to recording commands on tape 13, field position 124 of track 1 must first be loaded into memory 154. This is accomplished, as heretofore described, by first entering each command from keyboard 153, FIG. 1, into buffer 77, FIG. 4, and then transferring each command into memory 154, except that instead of loading each command into memory location 0, the commands will be entered in sequence and will occupy memory locations 0–7 as selected by address counter 461. In order to insure that address counter 461 begins at memory address 0, reset switch 492 of memory address 236, FIG. 3, is momentarily closed to reset binary to octal converter 251 and address counter 461. The first command is then entered into keyboard 153 and contains track location 02 field location 000 and command bit 8. It is then transferred into memory 154 by closing load memory switch 456 of memory read-write control 199. This switch sets flip-flop 284 and provides 24 clock pulses at the output of AND gate 274 which are supplied through common terminal c, FIG. 3, to OR gate 278, and through OR gate 162, and common terminal D to clock input 163 of buffer 77, FIG. 4. As previously described, at the end of one word time, divide by 24 bit counter 438 inhibits AND gate 274 and through common terminal Z and input 442 of OR gate 445 steps address counter 461 by one count. The output of one shot 462 strobes the updated count into binary to octal converter 251 which, of course, is memory location 1. The next command word contains track location 03, field location 000, and another 8 command bit which is entered in like manner into buffer 77, and transferred by load memory switch 456 into location 1 of memory 154. Upon the completion of this transfer, an output of divide by 24 bit counter steps address counter 461 by one count and gates the updated count into binary to octal converter 251. In this manner, all 8 command words are sequentially loded into memory 154. Each command, of course, contains the next sequential track location, the highest track location being track 09. In order to transfer the eight command words from memory locations 0–7 to tape 13, "tape data all" switch 417 of data to tape control 325, FIG. 1, is operated to set "tape data all" flip-flop 413. The set output of flip-flop 413 enables input 424 of AND gate 378 of memory read-write control 325, to gate an output from divide by 8 word counter 443. Input 427 of AND gate 380 is in turn inhibited by the output 443. Input 427 of AND gate 380 is in turn inhibited by the output of inverter 425. A second output of flip-flop 413 is coupled to input 420 of OR gate 422, one output of which is fed through amplifier 324 and common terminal b, FIG. 3, to the enable inputs 322 and 320 of AND gates 281 and 260, respectively. It is also further connected to input 326 of OR gate 327, an output of which energizes drive motor 18, and through common terminal 0, FIG. 4, to the control inputs of switches 42 and 46. Accordingly, bias lead 40 of record head 28 is connected to the output of bias oscillator 38, and signal lead 44 is coupled through terminal Q to the output of voltage to frequency converter 66, FIG. 3.

A second output of OR gate 422 of data to tape control 325, FIG. 1, is connected through common terminal a as an input of one shot 428, the output of which resets address counter 461 and binary to octal converter 251 to zero. After a 1.5 second delay during which forward drive motor 18 reaches the proper recording speed, an output of one shot 426 sets clock control flip-flop 284, enabling clock pulses at the output of AND gate 274 through common terminal c, FIG. 3, which are coupled as shift pulses through input 276 of OR gate 278 to input 280 of AND gate 281 and to input 282 of OR gate 162 (FIG. 3). Thus, in eight consecutive word times the eight command words, previously stored in memory 154, are shifted through OR gate 252 of memory 154 and AND gate 260, then through frequency converter 66 to tape 13 in a manner previously described. At the end of each word time, 24 bit counter 438, FIG. 1, outputs a pulse which steps divide by 8 word counter 443 by one count. Also through common terminal Z, FIG. 3, and input 442 of OR gate 445 steps address counter 461 to the next address. An output of one shot 462 strobes this address through gates 446 into binary to octal converter 251. Accordingly, the commands now stored in memory location 0–7 are recorded on tape in that order. Once the eight words are recorded, an output of divide by 8 word counter 443 resets clock control flip-flop 284 through an output of AND gate 378 which inhibits AND gate 274 to stop the transfer process. Drive motor 18, FIG. 4, is stopped when relay 342 is de-energized as flip-flop 413 is reset by a second output of AND gate 380, FIG. 1. An unconditional stop command is then recorded on tape 13 immediately following the eight command words. As previously mentioned, a stop command, 9, sets "stop" flip-flop 130, FIG. 4, which removes power from forward drive motor 18. A student then responds to the question by entering a number 0–7 in keyboard 153. Once a response is made "stop" flip-flop 130 is reset and power is again applied to forward drive motor 18. This stop command is first loaded into buffer 77 in a manner as previously described and contains all zeroes in the five most significant digits with a "stop" command, or 9, being placed in the least significant, or command bit position 144. The command word is entered into memory by switch 456 (FIG. 1) and is then transferred to tape, in a manner previously described, by closing switch 415 of data to tape control 325. Before programming continues, a notation is then made of the field and track position of tape 13 and head carrier 32, respectively, as indicated by digital readouts 72 and 70, respectively. When so desired, a student may be directed back to this position within the main lecture upon the completion of any further programmed commands which may be executed as a result of student response to test questions which are posed by the instructor. The track location, of course, will be track 1, since this portion of the lecture is recorded in track 1. It is assumed for the purpose of illustration that the field position is 325 of track 1, as indicated by field position indicator 72. Once this address is recorded, an appropriate "go to" command is entered into buffer 77 which directs tape recorder control 83 to position the tape to the first branch location which, as previously chosen, is field position 000 and track position 02. Each of these command words will contain a command bit 8 which, in the student use mode, will position the tape to this location upon the selection of "0" entered in keyboard 153. Once the tape has been repositioned to this location, record select switch 400 (FIG. 3) is now operated to the tape analog position which enables forward drive motor 18 in a manner previously described and connects signal input lead 45 of record head 30 to the output of audio amplifier 60. The instructor then records any comments and further instruction pertinent to the answer selected by a student. A notation is made of the tape position when any slides or further copy is to be displayed during the course of this further instruction. Once the analog portion of this response to a student answer is completed, record select switch 400 is then reset to the tape data position, which is as shown in FIG. 3, and digital commands are then recorded in the appropriate locations, as previously noted, in the associated digital channel B. At the end of this response to the student's selection, the instructor may desire to pose a further question, in which case, depending upon a selected answer the student may then be directed to eight other locations which would then be recorded on tape 13. In this case, eight other "go to" commands will be recorded at the end of these comments, each being followed by a stop command, allowing the student to make a selection as described above. Depending upon the selected answer, of course, the student may then be sent back to the main body of the lecture in track 1, field position 325 or directed, depending upon his response, to further branch locations. As was previously described, the student may be sent to a multiplicity of other branch locations for detailed instruction limited only by the capacity of tape 13. Each of the seven other branch locations are referenced by an appropriate "go to" command of tape recorder 83 and comments and further instruction, including slides and so forth, are then recorded in each of these channels. Once the information is recorded in each of branch locations within tracks 2–9, further information is then recorded in the auxiliary branch locations to which the student may be directed during the course of this particular portion of the lecture. Once all instruction is recorded the tape is positioned at field position 0 and track 0 in preparation for the student use mode of operation. Accordingly, mode switch 210 is operated to the "student use" mode position, as shown in FIG. 3. Contact 208 of mode switch 210 enables input 204 of AND gate 200 (FIG. 1). The student has access only to keyboard 153. When he is prepared to monitor the lecture, manual start switch 348 (FIG. 4) is momentarily closed which sets forward flip-flop 84 and energizes forward drive relay control 344 through AND gate 334 and relay 342, in a manner previously described. Accordingly, power is now applied through contacts 344 of relay 342 to forward drive motor 18. AND gates 182 and 192 (FIG. 1) are enabled by an output of inverter 217 which connects the clock and data signals from digital input 152 through AND gates 182 and 192 and terminals V and W, respectively, to the clock and data inputs of 4 bit shift register 234. Record select switch 400 is preferably operated to the tape data position as shown in FIG. 3. Playback lead 45 of record head 30, of tape recorder 10, FIG. 4, is connected through the normally closed contacts of switch 47 to the input of B.C.D. to decimal converter 52. Thus the student selectively monitors audio amplifier 54, printer 55, or C.R.T. 56. Digital information recorded in channel B of each of tracks 0–81 is now fed through signal lead 44 and the normally closed contacts of switch 46 and through common terminal P, FIG. 3, to the input of frequency to voltage converter 65. Frequency to voltage converter 65 converts the tones previously recorded in channel B to data and clock pulses which are then coupled to inputs 290 and 288 of AND gates 294 and 292, respectively, the outputs of which are coupled through OR gates 160 and 162 to the data and clock inputs 161 and 163, respectively, of buffer 7, FIG. 4. A second output of AND gate 292 is coupled to input 306 of OR gate 278, to the input of retriggerable one shot 308, and to the input of divide by 24 divider 309 for a purpose to be further explained. Henceforth, tape recorder 10 is automatically controlled by the commands which are recorded in channel B of each of tracks 0–81 and are permanently associated with the audio visual portion of any lecture recorded on tape 13. In order to illustrate how a command word is retrieved from tape 13 and interpreted in buffer 77, the slide command previously recorded in track 0 will be processed. Once field position 102 is reached, tones are coupled from playback head 28 through switch 46 to frequency to voltage converter 65. The tones are then separated into data and clock pulses which are serially fed through AND gates 294 and 292, respectively, and through OR gates 160 and 162 to inputs 161 and 163 of buffer 77, respectively, FIG. 4. The first clock pulse at the output of AND gate 292 sets retriggerable one shot 308. A long time constant keeps one shot 308 set during any interval between clock pulses. The output of retriggerable one shot triggers one shot 488 to a set condition. Reset output R of one shot 488 inhibits input 490 of AND gate 470. Each clock pulse steps divide by 24 divider 309 by one count. At the end of one word time, the slide command is completely loaded into buffer 77. The last clock pulse from the output of AND gate 292 steps divide by 24 divider 409 an output of which then sets flip-flop 480. The set output of flip-flop 480 enables AND gate 483, the output of which is coupled to input 486 of OR gate 445. After a short delay, retriggerable one shot 308 shifts to the reset condition which event resets flip-flop 480 triggering one shot 462 and also stepping counter 461 by one count. After a further short delay, an output of one shot 462 strobes the updated count of address counter 461 into binary to octal converter 251. A second output of one shot 462 produces a strobe pulse through AND gates 470 and 149 and thence through common terminal G to OR gate 147, FIG. 4. An output at the OR gate 147 strobes the command digit C into binary to alphanumeric converter 146. A pulse at output C of binary to alphanumeric converter 146 then strobes a 12 from the second and third positions of buffer 77 into B.C.D. to decimal converter 138. Slide 12 is then displayed to the student in a manner previously described. Each single word command associated with the lecture is processed in a similar manner wherein it is first stored in buffer 77 and the command digit is interpreted which initiates the proper action to show slides or hard copy to a student. In order to illustrate how a branch command would be executed, it is assumed the student has monitored the lecture up to the location at which a question was asked in channel 1. All eight branch commands must be retrieved from tape and serially fed through buffer 77 to memory locations 0–7. Once these commands are stored in memory locations 0–7, a stop command will then be loaded into buffer register 77 as follows: Data and clock pulses of each of the command words are fed from frequency to voltage converter 65 through AND gates 292 and 294 to buffer register 77, FIG. 4. A first clock pulse occurring at the output of AND gate 292 is again fed to input 306 of OR gate 278, FIG. 3, and to the input of retriggerable one shot 308 which is set upon the occurrence of this first clock pulse. The output of one shot 308 is coupled as a reset to input rs of divide by 24 divider 308 and input R of flip-flop 480. It also sets one shot 488 and the reset output of one shot 408 inhibits AND gate 470. Retriggerable one shot 308 then remains set as long as the clock pulse train is applied from frequency to voltage converter 65. At the end of one word time, the first branch command is now loaded in buffer register 77. An output of divide by 24 divider 409 sets flip-flop 480 and enables AND gate 483. The reset output of flip-flop 480 resets address counter 461 to 0 through input 492 of OR gate 476. Accordingly, as the first bit of the second branch command is entered into buffer 77, the most significant bit of register 77 is shifted through input 310 of memory access gate 312 by a clock pulse applied through OR gate 278. Accordingly, at the end of the second word time, the first command word is now loaded into memory location 0. An output of divide by 24 divider 309 steps address counter 462 by one count and the output of one shot 462 strobes the updated address through gates 466 into binary to octal converter 251. During the third word time, the second word is transferred from buffer 77 into memory location 1 in a manner as described above. This process continues until all eight command words are loaded in the order in which they were recorded into locations 0–7 of memory 154. During the ninth word time a stop command is transferred into buffer 77 and command word eight is loaded into location 7 of memory 154. Since no more clock pulses are available at the input of retriggerable one shot 308, after a short delay it returns to a reset condition and provides an output which resets flip-flop 480 and one shot 488. The reset output of one shot 488 then enables input 490 of AND gate 470. An output of AND gate 483 triggers one shot 462, the output of which strobes an updated count of address counter 461 into binary to octal converter 251 and provides a strobe at input 468 of AND gate 470 which again provides a strobe to input 148 of binary to alphanumeric converter 146, FIG. 4. The command located in digit position 144 is a stop command 9. A pulse at the 9 output of binary to alphanumeric converter 146 sets stop flip-flop 130. The set output of stop flip-flop 130 resets "go to" flip-flop 82 through inverter 255 and inhibits input 368 of AND gate 270 through common terminal J, FIG. 3. The reset output of stop flip-flop 130 inhibits input 336 of AND gate 334 which deenergizes forward drive control relay 342 stopping forward drive motor 18. The student then responds to a question by selecting one of eight possible answers by entering a 0–7 into keyboard 153. Clock and data pulses are now coupled through AND gates 182 and 192 into 4 bit shift register 234. A pulse at the output of one shot 196 of digital input 152 is applied through AND gate 200 to input 248 of OR gate 250 to set flip-flop 284. A second output of AND gate 200 which is connected through terminal Y to input 246 of AND gate 338 strobes the three least significant bits of 4 bit shift register 234 through address buffer register 236 into binary to octal converter 251. Accordingly, a memory address 0–7 is selected by the output of binary to octal converter 251. Clock pulses now gated from the output of AND gate 274 (FIG. 1) of memory read-write control 199 are fed through common terminal c, FIG. 3, to input 276 of OR gate 278. The command word now stored in the selected memory location is transferred through OR gate 252 and AND gate 258 to the data input 161 of buffer 77, FIG. 4. Clock pulses from AND gate 274 (FIG. 1) are simultaneously fed through input 282 of OR gate 162 to clock input 163 of buffer 77. When the word from memory 154 is shifted into buffer 77 at the end of one word time, an output of divide by 24 divider 438 of memory read-write control 199 triggers one shot 462, the output of which strobes a command digit 144 into binary to alphanumeric converter 146 through AND gate 470, in a manner previously desscribed. This is a "go to" command which directs the student to a selected branch location, previously recorded on tape 13. Once tape recorder control 83 has positioned the tape to the selected branch location, the student is then given further instructions and directed either back to the main body of the lecture or to any of a multiplicity of other auxiliary locations previously selected by the instructor. At any of these auxiliary branch locations, the student may be questioned repeatedly and sent to even further auxiliary branch locations for detailed instruction in a particular course or subject.

From the foregoing, it will be appreciated that this invention provides a substantial advancement in automated or mechanized instructional machines and systems. In addition to the many improvements reflected by the structure of the present system, it solves perhaps the principal problem heretofore experienced in expanding the use of such systems. This is the problem of computer soft ware and the necessity of complex and often massive computer programming by computer specialists. This need is eliminated. The full control of the system is readily effected by the operation of a simple desk calculator-type keyboard, requiring no expertise in computer programming. Considering that this advantage is obtained in an instructional machine of almost limitless versatility and scope of storage and recall, it is believed that it will now be practical to vastly expand the usage of such machines.

What is claimed is:

1. An instruction machine comprising:
   recording medium transport means for accommodating and for, selectively, moving a recording medium, said medium having at least one track, said track having at least two, A, an audio, and B, a digitally encoded, coordinate channels;
   transducer means positionable adjacent to said recording medium for playing back from separate signals on said track of said A and B channels;
   said signals including audio signals disposed on channel A and digital words and addresses on channel B;
   digital generating means, including a keyboard for selecting and generating a digital output;
   memory means responsive to said transducer means and a selected plurality of digital words sensed by said transducer means from at least one first address on a said B channel, for storing each said word in a discrete digitally addressable storage location;
   control means responsive to a digital output of said digital generating means, a memory address output, and coupled to said memory means for providing as an output of said memory means a discrete one of said digital words;
   positioning means responsive to a said one of said digital words, representative of a second address on said recording medium, for relatively positioning said transducer means with respect to said recording medium adjacent a said second address for enabling said transducer means to engage and reproduce from a thus selected portion of a said track; and
   audio means coupled to said transducer means for playing back from said channel A aural material from said selected portion of said track;
   whereby one of said plurality of words located at a first address on said recording medium and representative of a second and remote address on said recording medium may be selected by a particular operation of said keyboard enabling the machine to locate and play back material as a function of a student's response entered on said keyboard.

2. An instruction machine as set forth in claim 1 wherein said control means includes:
   a digital register having a plurality of digital storage positions for temporarily storing selected digital words, and including means for temporarily storing a recording medium address word in one said storage position, and an output of said memory means being coupled to said digital register for transferring words, including recording medium address words, to said digital register; and
   means for selectively transferring a said recording medium address word from said digital register to said positioning means.

3. An instruction machine as set forth in claim 2 wherein:
   said transducer means includes means for recording on said A and B channels;

said memory means includes means for receiving and temporarily storing digital words successively appearing in the same said selected storage position in said digital register; and means coupling the output of said memory means to said transducer means for supplying, successively, to said transducer means said digital words applied by said digital register to said memory means for recording said last-named digital words, successively, in a selected order on said B channel of a said track.

4. An instruction machine as set forth in claim 1 wherein said memory means comprises memory address means for selectively determining the address within said memory means wherein an input digital word would be stored and from which a digital word would be supplied as an output.

5. An instruction machine as set forth in claim 4 wherein said memory address means is selectively responsive to said digital generating means for controlling said memory means, whereby a selected stored digital word is provided as an output.

6. An instruction machine as set forth in claim 5 wherein said memory address means further comprises an address counter means responsive to the occurrence of a digital word output from said register, and alternately from said B channel record-playback means, for operating said memory address means, whereby words sequentially received from said register and said channel B by said memory means are stored at like sequential addresses in said memory means.

7. An instruction machine as set forth in claim 1 further comprising at least one auxiliary readout means responsive to a selected digital word in said digital register for providing selected aural information as an output from said auxiliary readout means.

8. An instruction machine as set forth in claim 7 wherein one of said auxiliary readout means comprises a slide projector and includes means responsive to a received digital word from said digital register for displaying any one of a selected group of slides.

9. An instruction machine as set forth in claim 7 further comprising an additional auxiliary readout means, in turn comprising an electronic imaging display responsive to a selected digital word from said register to provide selected images as an output.

10. An instruction machine as set forth in claim 1 wherein said recording medium transport means is a multi-track tape transport.

11. An instruction machine comprising:

a recording medium having at least one track, said track having at least one digitally encoded channel having recorded thereon at, at least at one recording location a plurality of digitally encoded words, each word representative of separate discrete locations on said recording medium;

recording medium transport means for accommodating and for selectively moving said recording medium;

transducer means positionable adjacent to said recording medium for playing back from said recording medium;

digital generating means, including a keyboard for selecting and generating a digital output;

memory means responsive to said transducer means and a selected plurality of digital words sensed by said transducer means from at least one, a first, address on said digitally encoded channel, for storing each said word in a discrete digitally addressable storage location;

control means responsive to a digital output of said digital generating means, a memory address output, and coupled to said memory means for providing as an output of said memory means a discrete one of said digital words;

positioning means responsive to a said one of said digital words, representative of a second address on said recording medium, for relatively positioning said transducer means with respect to said recording medium adjacent said second address for enabling said transducer means to engage and reproduce a thus selected portion of a said track; and readout means coupled to said transducer means for reproducing information from a recording responsive to signals recorded on said recording medium;

whereby one of said selected plurality of words located at a first address on said recording medium and representative of a second and remote address on said recording medium is selected by a particular operation of said keyboard enabling the machine to locate and play back material as a function of a student's response entered on said keyboard.

12. An instruction machine as set forth in claim 11 wherein:

said recording medium has at least two, A, an audio, and B, said digitally encoded channels; and said readout means comprises means for playing back from said channel A aural material from said selected portion of said track.

* * * * *